IDENTIFICATION MEANS FOR KEYS AND SIMILAR SUSPENSIBLE OBJECTS

Filed April 11, 1960 2 Sheets-Sheet 1

INVENTOR:
SCIPIONE ROGER MANZARDO
By: Otto John Munz
Atty.

IDENTIFICATION MEANS FOR KEYS AND SIMILAR SUSPENSIBLE OBJECTS

Filed April 11, 1960 2 Sheets-Sheet 2

INVENTOR:
SCIPIONE ROGER MANZARDO
By: Otto John Munz
Atty.

United States Patent Office 3,113,393
Patented Dec. 10, 1963

3,113,393
IDENTIFICATION MEANS FOR KEYS AND SIMILAR SUSPENSIBLE OBJECTS

Scipione Roger Manzardo, Wesemlinstrasse 48, Lucerne, Switzerland

Filed Apr. 11, 1960, Ser. No. 21,165
3 Claims. (Cl. 40—330)

This invention relates to identification means for keys and similar suspensible objects.

To identify keys it has already been proposed to apply to the handle of the key a cap-like covering which, for instance by its color and by a designation applied to the covering, permits of the respective key being easily distinguished from similar ones.

Now there are keys and other objects which cannot be pushed into said coverings or do not find sufficient hold therein. One object of the invention is therefore the provision of means which enable any keys and similar suspensible objects to be conveniently connected to cap-like coverings of the type. Another object of the invention is to create for keys of any shape and similar objects an advantageous identification means which also permits of suspending these keys and similar objects. Still another object of the invention is to provide means adapted to connect together a plurality of keys each provided with an identification means, and to connect them with an additional identification means common to all these keys, which enables this group of keys to be suspended conjointly.

Further objects and features of the invention will be understood from the following specification taken with the accompanying drawings in which several forms of embodiment are illustrated.

Figures 1, 2, 3, 4, 5, 6, 7, 8, 9, 10, 11, 12:
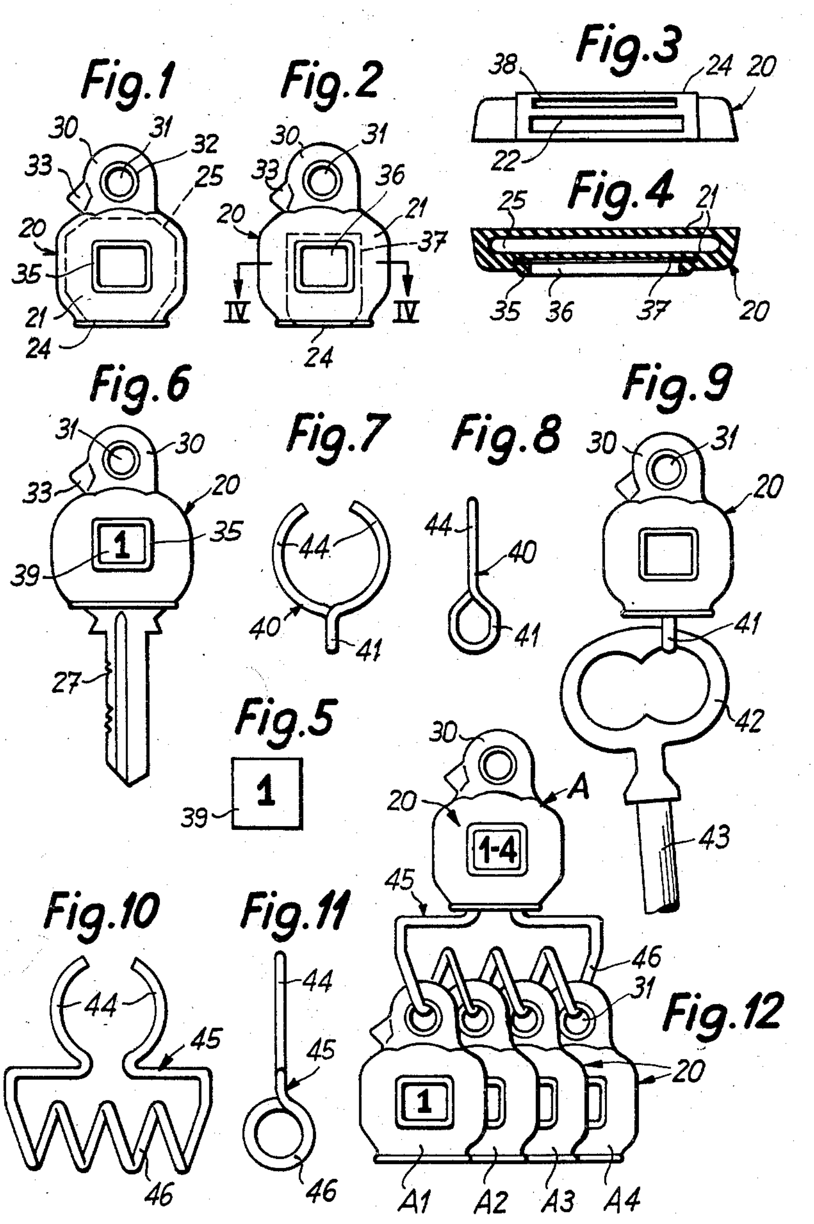
FIGS. 1 and 2 show each a front view of an elastic cap capable of being turned which, as identification means, can be slipped over the handle of a key or other object to resiliently grip the same.
FIG. 3 shows the same cap from below, on a larger scale.
FIG. 4 shows a sectional view taken on the line IV—IV of FIG. 2, also on a larger scale.
FIG. 5 shows a designation plate for application to the cap according to FIG. 1.
FIG. 6 illustrates the cap with the designation plate, as applied to the handle of a substantially flat key.
FIG. 7 is the front view of a holding wire.
FIG. 8 is a side view of the same holding wire.
FIG. 9 shows how, with the help of the holding wire, the cap according to FIGS. 1–4 may also be connected to a very large ring-shaped handle of a bit key.
FIG. 10 is a front view of a modified form of a holding wire.
FIG. 11 is a side view of the same holding wire.
FIG. 12 shows how, with the help of the holding wire according to FIGS. 10 and 11, several cap-like identification means according to FIGS. 1–4 applied to handles, may be connected to each other and to an additional similar cap.

With reference to FIGS. 1–4, the cap 20 shown is made of some flexible stretchable material, such as natural or synthetic rubber or rubber-like synthetic substance. The cap 20 mainly consists of two flat side walls 21 which are joined together by a rim along their peripheries so as to leave an insertion opening 22. The edge of the insertion opening 22 is reinforced by a coextensive bead 24. Between the two side walls 21, the cap 20 has a recess 25 (FIGS. 1 and 4) into which, through the opening 22, can be pushed the handle of a key 27 or other object, as shown for instance in FIG. 6.

At its peripheral edge, opposite the insertion opening 22, the cap 20 has an outstanding suspension lug or tongue 30 integral with the cap 20 and provided with a throughgoing hole 31, which permits of the cap being hung up with the key or the like inserted therein. The edge of the hole 31 is beaded as indicated at 32, FIGURE 1. The suspension lug 30 has provided thereon a laterally projecting cam 33 integral with cap 20 and lug 30. Said cam enables, by feeling with a finger, to recognize more conveniently the proper position of insertion of the key 27, even in the dark.

One side wall 21 of the cap 20 has a frame 35 which is formed of embossed ribs and defines a window 36 leading to a narrow recess 37 of the respective wall 21 (FIGS. 2 and 4). Into the recess 37, through an opening 38 (FIG. 3) a small designation plate 39 (FIG. 5) may be inserted, so that subsequently, through window 36, a numeral or lettering of the plate 39 becomes visible as in FIG. 6. The opening 38 is parallel to the insertion opening 22 within the bead 24. As shown by the broken lines of FIG. 2, the recess 37 for the designation plate 39 is somewhat constricted towards the opening 38, in order to prevent the inserted plate 38 slipping out of recess 37.

The described cap may be applied not only to the ring-handle of an ordinary flat key 27, but also to flat and bit keys which differ in shape, size and thickness, because the cap 20 can be stretched and extended elastically within relatively wide limits. If the key handle is not too small, the cap will seat tightly on the key. With the aid of the designation plates 39, the keys, which are often similar to one another, may be clearly marked, so that the user immediately knows, or may look up in a list, which key belongs to which door. In order to render distinguishing of keys still simpler, it is preferable to have the caps made in different colors.

Though the described cap, by reason of its elasticity, may be adapted to key handles varying greatly in size and shape, there are older bit keys with such an extraordinarily large ring-handle, and other keys with handles of such a shape, for instance triangular, that they can be inserted into the cap 20 only with difficulty or not at all. Other keys frequently have handles so small that they are not firmly retained in the cap 20. For such cases there is provided a holding wire 40 according to FIGS. 7 and 8, in order to ensure a suitable connection between the cap 20 serving as identification means and the key handle. The holding wire 40 forms in its middle section an eye 41 which may be passed through the opening of any key handle, for instance the ring 42 of a bit key 43, as shown in FIG. 9. The two extremities 44 of the holding wire 40 together form portions of a ring which may readily be inserted into the cap 20 serving as identification means. By means of the hole 31 in the suspension lug 30, the key 43 may be hung on a key rack or in a key box. Eye 41 and annular sections 44 preferably extend in planes intersecting at right angles.

If desired, it is possible to attach several keys to the eye 41, say, spare keys for a certain lock.

FIGS. 10 and 11 illustrate another design of the holding wire 45, whose extremities 44 again form portions of a ring which can be inserted into the cap 20 of an identification means A (FIG. 12). The middle section of the holding wire, however, forms a helix 46 whose axis runs horizontally, when said identification means A is hung on its suspension lug 30. In every turn of the helix 46 an additional identification means A1, A2, A3 or A4 may be hung, by introducing the wire of the helix 46 through the opening 31 of the respective identification means, prior to pushing the sections 44 into the cap 20 of the first-named identification means A. Into the cap of each identification means A1, A2, A3 and A4, the handle of a key can be put. From FIG. 12 it can be seen that, in the described way, with the help of the identification means A1–A4, several keys may be hung on the holding wire 45 which, in turn, with the help of the identificaiton means A, can be hung on a single hook. This arrangement is particularly advantageous if several keys are always used together, say, for an entrance door to a depot and for several additional rooms thereof, which are individually closed by various keys. For this, the identification means A and A1–A4 may have the same or distinctive colors.

Figure 13:
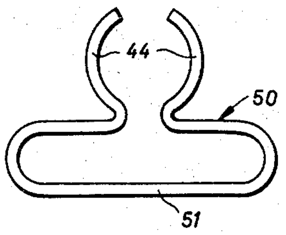
FIG. 13 shows again the front view of another form of a holding wire.
Figure 14:
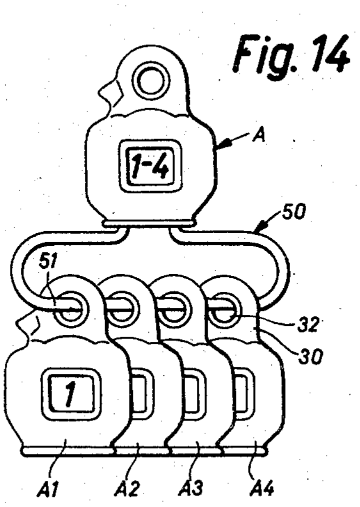
FIG. 14 shows in representation similar to FIG. 12, how, with the help of the holding wire according to FIG. 13, several cap-like identification means according to FIGS. 1–4 to be applied to key handles, may be connected to each other or to an additional similar cap.

FIG. 13 shows another holding wire 50 which differs from the described holding wire 45 only in that, instead of the helix 46, there is now provided a rectilinear wire section 51. Again, on the latter according to FIG. 14, several cap-like identification means A1, A2, A3, A4 may be filed, in each of which a key handle can be inserted.

Figure 15:
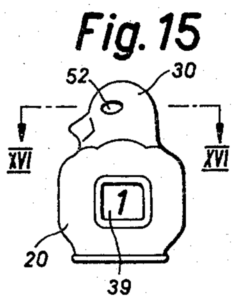
FIG. 15 represents a front view of the cap as modified.
Figure 16:
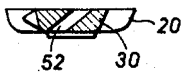
FIG. 16 is a sectional view taken on the line XVI—XVI of FIG. 15.

Advantageously, instead of the cap-like identification means A1, A2, A3 and A4 of FIG. 4, such according to FIGS. 15 and 16, somewhat different in design, may be employed. At the tongue 30 of cap 20 there is then provided a bore 52 which extends obliquely to the front and back of the cap 20, of a diameter not much greater than that of the wire 50. When pushing the identification means according to FIGS. 15 and 16 onto the portion 51 of the holding wire 50, by passing the latter through the bore 52, the cap takes up an oblique position relative to the plane containing the axis of wire 50. Because of this, the designation plates 39 on a plurality of caps filed on the holding wire 50 will be better visible.

Figure 19:
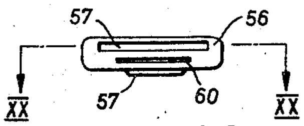
FIG. 19 shows a covering of the identification means designed as sleeve according to FIG. 17 alone and in top view.
Figure 20:
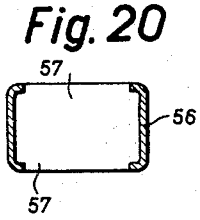
FIG. 20 is a vertical section taken on the line XX—XX of FIG. 19.
Figure 17:
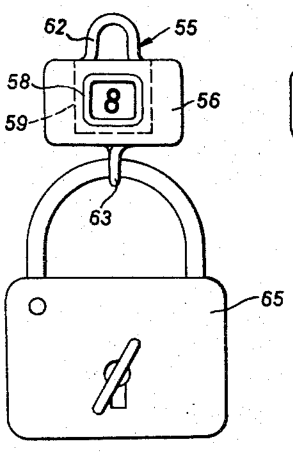
FIG. 17 shows the front view of another identification means on which a padlock is suspended instead of a key.
Figure 18:
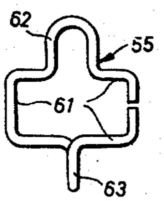
FIG. 18 represents a holding wire of the identification means according to FIG. 17 alone.

According to FIG. 17, there is a holding wire 55 arranged within a covering 59 made of a flexibly extensible material, such as rubber or rubber-like synthetic resin, which covering is not designed as a cap, but as a sleeve and provided with an opening 57 at top and bottom, as shown in FIGS. 19 and 20. The sleeve 56 is formed flat and has at its front a frame 58 constituted by embossed ribs, which defines a window leading to a narrow recess 59 in the respective wall of said sleeve (FIG. 17). Into said recess, through a slit-like opening 60 (FIG. 19) at the upper end face of the sleeve, a small designation plate can be put which may be similar to that according to FIG. 5. Then, through the window a numeral or other lettering of the plate is visible. The holding wire 55 has the shape shown at FIG. 18. It comprises a section 61 insertable into the sleeve 56 and two substantially looped-shaped sections or bends 62, 63 intended to project out thereof at top and bottom, as shown in FIG. 17. The upper bend 62 extends in the same plane as the insertable section 61, whereas the lower bend 63 extends in another plane intersecting the first-named plane at about 90 degrees, similar to the eye 41 of the holding wire 40 shown in FIG. 7. The ends of the holding wire 55 are on the portion 61 that is inserted into the sleeve 56.

On the lower bend 63, the handle of any key may be hung as shown in FIG. 9. According to FIG. 17, the bend 63 has a padlock 65 hung thereon until it is required for locking a container or a door. The upper bend 62 serves for hanging the whole on a hook of a key-rack, a key-box or the like. It is understood that, instead of a key or a padlock, any other suspensible small objects, such as tools, may be hung on the lower bend 63.

All disclosed identification means are primarily intended for use in connection with keys. This is not only of advantage in the small household, but to a much greater extent for keeping the numerous keys in commercial and industrial concerns, administrations, hotels, hospitals, and so on. By different colors of the caps 20 or sleeves 56, the keys to various departments or floors can be marked. It may also be arranged that the keys with identification means of a certain definite color may only be handed over to certain persons against a receipt.

The caps 20 and sleeves 56 may have in known manner luminescent properties, in order that they may readily be distinguished from each other in the dark. At least one portion of the outer surface of the caps 20 and sleeves 56 may be roughened so as to be capable of being written on with ink, lead pencil or the like. Preferably this marking is done within the frame 35 or 58 which then protects it from being wiped off unintentionally.

What I claim is:

1. In a holder for keys, a hollow tab comprising a pair of side walls having an outline corresponding generally to the handle of a key, a rim integral with and connecting the peripheries of said walls to hold the same in closely-spaced parallel relation, there being an opening in said rim into the space between said walls an apertured lug integral and coplanar with said rim and extending outwardly therefrom opposite said opening, a key hook of bent wire having a first portion substantially in the shape of said side walls and inserted through said opening and releasably held between said side walls, said hook having a looped portion depending from said tab externally of said walls thereof, and on and from which at least one key may be held and suspended.

2. In a key holder and identification tab, a pair of side walls conforming generally to the shape of the handle of a key, a rim extending about the peripheries of said walls and integrally connecting the same in parallel relation, there being an opening in said rim through which the handle of a key may be inserted and removably held between said walls, and an apertured lug extending radially outwardly from said rim opposite said opening and by which a key held in said tab may be suspended, said lug being flat and substantially coplanar with said walls, the aperture therein extending at an acute angle to the plane of said lug.

3. In a holder and identification for keys, a first tab of rubber-like material comprising a pair of side walls having an outline and shape corresponding to the handle portion of a key, a rim extending about the peripheries of said walls and integrally connecting the same in spaced parallel relation, there being a hiatus in said rim to define an opening through which the handle portion of a key may be inserted and removably held, an apertured lug integral with said first tab and extending outwardly from said rim, diametrically opposite said opening therein, a holder comprising a single length of wire having an elongated central portion, the ends of said central portion being curved upwardly and inwardly toward each other, then terminating upwardly in arcuately and inwardly curved end portions conjointly defining a shape sized to pass through said opening and fitting snugly within the space between the side walls of said first tab, all portions of said holder being coplanar, and a plurality of tabs like said first tab and each having the aperture of its lug threaded on the central portion of said holder.

(References on following page)

References Cited in the file of this patent

UNITED STATES PATENTS

| | | |
|---|---|---|
| 1,322,815 | Patterson | Nov. 25, 1919 |
| 1,593,254 | Guthe | July 20, 1926 |
| 1,642,963 | Lynch | Sept. 20, 1927 |
| 1,681,710 | Ostrander | Aug. 21, 1928 |
| 1,722,014 | Patterson | July 23, 1929 |
| 1,796,751 | Faircloth | Mar. 17, 1931 |
| 1,868,563 | Circourel | July 26, 1932 |
| 2,564,242 | Wendt | Aug. 14, 1951 |
| 2,759,280 | Schlage | Aug. 21, 1956 |
| 2,932,107 | Manzardo | Apr. 12, 1960 |

FOREIGN PATENTS

| | | |
|---|---|---|
| 21,311 | Great Britain | Nov. 23, 1892 |
| 76,347 | Denmark | Aug. 24, 1953 |
| 296,755 | Germany | Mar. 2, 1917 |
| 528,705 | England | Nov. 5, 1940 |